(12) United States Patent
McFarland et al.

(10) Patent No.: US 11,347,287 B2
(45) Date of Patent: *May 31, 2022

(54) THERMAL MANAGEMENT OF WIRELESS ACCESS POINTS

(71) Applicant: Plume Design, Inc., Palo Alto, CA (US)

(72) Inventors: William McFarland, Portola Valley, CA (US); Yoseph Malkin, San Jose, CA (US); Richard Chang, Sunnyvale, CA (US); Patrick Hanley, San Mateo, CA (US)

(73) Assignee: Plume Design, Inc., Palo Alto, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/769,885

(22) PCT Filed: Nov. 30, 2018

(86) PCT No.: PCT/US2018/063233
§ 371 (c)(1),
(2) Date: Jun. 4, 2020

(87) PCT Pub. No.: WO2019/199358
PCT Pub. Date: Oct. 17, 2019

(65) Prior Publication Data
US 2020/0387204 A1 Dec. 10, 2020

Related U.S. Application Data

(63) Continuation of application No. 15/832,878, filed on Dec. 6, 2017, now Pat. No. 10,178,578, and a
(Continued)

(51) Int. Cl.
*G06F 1/20* (2006.01)
*H04W 52/38* (2009.01)
(Continued)

(52) U.S. Cl.
CPC ............. *G06F 1/206* (2013.01); *G01K 1/024* (2013.01); *G01K 3/005* (2013.01); *H04B 17/318* (2015.01);
(Continued)

(58) Field of Classification Search
None
See application file for complete search history.

(56) References Cited

U.S. PATENT DOCUMENTS 9,055,470 B2 * 6/2015 Sahu ................. H04W 52/0261
9,401,977 B1 7/2016 Gaw
(Continued)

FOREIGN PATENT DOCUMENTS

KR 1020160085640 A 7/2016

OTHER PUBLICATIONS

Jul. 22, 2021, Extended European Search Report for European Patent Application: EP 18 91 4667.
(Continued)

*Primary Examiner* — Tri H Phan
(74) *Attorney, Agent, or Firm* — Clements Bernard Baratta; Lawrence A. Baratta, Jr.; Ryan Odessa

(57) ABSTRACT

The present disclosure relates to thermal management of wireless access points including local thermal management, cloud-based thermal management, and thermal management based on optimization and operation such as in a distributed Wi-Fi network. The objective of the present disclosure is for thermal management in access points allowing small form-factors and aesthetic designs, preventing overheating and without requiring reduced performance or reduced hardware. Generally, the systems and methods detect when access points are nearing overheating and alter their operation so as to minimize the reduction of performance in the network while reducing power consumption.

20 Claims, 8 Drawing Sheets

Related U.S. Application Data continuation of application No. 15/832,822, filed on Dec. 6, 2017, now Pat. No. 10,433,194, and a continuation of application No. 15/832,816, filed on Dec. 6, 2017, now Pat. No. 10,379,584.

(51) Int. Cl.

| | | |
|---|---|---|
| *H04B 17/318* | (2015.01) | |
| *G01K 3/00* | (2006.01) | |
| *H04W 52/36* | (2009.01) | |
| *G01K 1/02* | (2021.01) | |
| *G01K 1/024* | (2021.01) | |
| *G01K 13/00* | (2021.01) | |
| *H04B 7/0413* | (2017.01) | |
| *H04W 84/12* | (2009.01) | |
| *H04W 88/08* | (2009.01) | |

(52) U.S. Cl.
CPC ......... *H04W 52/367* (2013.01); *H04W 52/38* (2013.01); *G01K 13/00* (2013.01); *H04B 7/0413* (2013.01); *H04W 84/12* (2013.01); *H04W 88/08* (2013.01)

(56) References Cited

U.S. PATENT DOCUMENTS

| | | | | |
|---|---|---|---|---|
| 9,459,879 B2* | 10/2016 | Gupta | ............... | G06F 9/4893 |
| 9,518,873 B2* | 12/2016 | Bellamkonda | ........... | G01K 7/42 |
| 9,860,773 B2 | 1/2018 | Roessel et al. | | |
| 9,985,582 B2 | 5/2018 | Uebel et al. | | |
| 10,025,329 B2* | 7/2018 | Slaby | ............... | G06F 1/206 |
| 10,178,578 B1* | 1/2019 | McFarland | ........... | H04W 24/10 |
| 10,379,584 B2* | 8/2019 | McFarland | ........... | H04B 17/318 |
| 10,433,194 B2* | 10/2019 | McFarland | ........... | H04W 24/04 |
| 10,433,248 B2* | 10/2019 | Wang | ............... | H04L 67/12 |
| 10,750,640 B2* | 8/2020 | Andrews | ............... | C09K 5/063 |
| 11,073,880 B2* | 7/2021 | Geekie | ............... | G05B 19/0428 |
| 2007/0191993 A1 | 8/2007 | Wyatt | | |
| 2010/0091691 A1 | 4/2010 | Dorsey et al. | | |
| 2010/0285828 A1 | 11/2010 | Panian et al. | | |
| 2011/0110291 A1 | 5/2011 | Ishii | | |
| 2011/0298301 A1 | 12/2011 | Wong et al. | | |
| 2013/0170417 A1* | 7/2013 | Thomas | ........... | H04W 52/0216 370/311 |
| 2013/0322318 A1* | 12/2013 | Das | ............... | H04W 52/0219 370/311 |
| 2014/0247729 A1 | 9/2014 | Sahu et al. | | |
| 2015/0288792 A1 | 10/2015 | Nayak et al. | | |
| 2016/0124476 A1 | 5/2016 | Mittal et al. | | |
| 2016/0280040 A1 | 9/2016 | Connell et al. | | |
| 2016/0283443 A1* | 9/2016 | Michalscheck | ...... | G05B 19/406 |
| 2017/0070894 A1 | 3/2017 | Kumar et al. | | |
| 2017/0168532 A1 | 6/2017 | Kim | | |
| 2017/0195953 A1 | 7/2017 | Amorim De et al. | | |
| 2017/0331899 A1 | 11/2017 | Binder et al. | | |
| 2017/0351630 A1 | 12/2017 | Li et al. | | |
| 2018/0058710 A1 | 3/2018 | Lewis | | |
| 2018/0102886 A1 | 4/2018 | Yamada | | |
| 2018/0214028 A1 | 8/2018 | Zhang et al. | | |
| 2018/0259985 A1 | 9/2018 | Im et al. | | |

OTHER PUBLICATIONS

Dec. 17, 2019 International Search Report and Written Opinion for International Application No. PCT/US2018/063233.

* cited by examiner

THERMAL MANAGEMENT OF WIRELESS ACCESS POINTS

CROSS-REFERENCE TO RELATED APPLICATION(S)

The present patent application/patent is a national stage of PCT Application No. PCT/US2018/063233, filed on Nov. 30, 2018, and entitled "Thermal management of wireless access points," which claims priority to U.S. Patent Application Nos., 15/832,816, 15/832,822, and 15/832,878, each filed on Dec. 6, 2017, and these are now U.S. Pat. Nos. 10,379,584 (issued Sep. 13, 2019), 10,433,194 (issued Oct. 1, 2019), and 10,178,578 (issued Aug. 1, 2019), respectively, the contents of each are incorporated by reference in their entirety.

FIELD OF THE DISCLOSURE

The present disclosure generally relates to wireless networking systems and methods. More particularly, the present disclosure relates to thermal management of wireless access points including local thermal management, cloud-based thermal management, and thermal management based on optimization and operation in a distributed Wi-Fi network.

BACKGROUND OF THE DISCLOSURE

In Wi-Fi networks and the like, the trend is deploying smaller form-factor devices that have compelling aesthetic designs. This is especially important in mesh and distributed Wi-Fi systems which require numerous access points deployed throughout a location. Disadvantageously, compact designs of powerful access points, wireless routers, etc., containing multiple radios each with numerous Radio Frequency (RF) chains, can result in the wireless router dissipating more heat than can be quickly removed from it. Typical solutions today are to limit the number of radio chains built into a device, or the output power that each radio chain can deliver. However, both of these solutions reduce the maximum possible performance of the wireless router. Alternatively, some wireless routers are designed with larger surface area, and include heat sinks, venting holes, fans, and other additions, increasing the size, complexity, and cost of the product. This problem is exacerbated in a distributed Wi-Fi system. Such systems use multiple APs distributed about a location. Consumers place an added priority on such access points being small and attractive. Small size, no external heat sinks, no venting holes, quiet operation without fans, all make the product more attractive, but they make keeping the product cool more difficult. The result is the potential for the APs to overheat, degrading performance and product lifetime.

BRIEF SUMMARY OF THE DISCLOSURE

In an embodiment, a method of thermal control of an access point includes determining temperature associated with the access point including one or more radio chips operating therein; responsive to the temperature exceeding a first threshold, performing one or more thermal mitigation techniques to modify operating conditions of the one or more radio chips; and, responsive to the temperature being lower than a second threshold, reverting back the one or more thermal mitigation techniques. The one or more thermal mitigation techniques can include reducing a Multiple Input, Multiple Output (MIMO) dimension on the one or more radio chips. The MIMO dimension can be reduced only on transmissions and not on receptions. The one or more thermal mitigation techniques can include turning off any of the one or more radio chips. The one or more thermal mitigation techniques can include reducing power of a transmitter associated with the one or more radio chips. The one or more thermal mitigation techniques can include controlling a duty cycle of a transmitter associated with the one or more radio chips. The duty cycle can be controlled through off-channel scans. The duty cycle can be controlled via one of software and low-level hardware mechanisms. The duty cycle can be controlled between 100% to 0% in a feedback loop which continually adjusts the duty cycle based on the determining. The one or more thermal mitigation techniques can include a control loop which operates in a continuous manner.

The second threshold can be different from the first threshold for a hysteresis band to maintain stability in the thermal control. The temperature can be determined at a plurality of points in the access point and the one or more thermal mitigation techniques are selected based on which temperature is above the first threshold. The access point can include one or more radios, and wherein the one or more thermal mitigation techniques can include moving a client device from one radio to a different radio of the one or more radios. The one or more thermal mitigation techniques can include one of shutting down and rebooting the access point. There can be multiple temperature thresholds and one of multiple thermal mitigation techniques can be triggered depending on which threshold is crossed. The determining of the temperature can be based on observation of a duty cycle.

In another embodiment, an access point configured for local thermal control includes one or more radios; a processor communicatively coupled to the one or more radios and configured to determine temperature associated with the one or more radios operating therein; responsive to the temperature exceeding a first threshold, perform one or more thermal mitigation techniques to modify operating conditions of the one or more radios; and, responsive to the temperature being lower than a second threshold, revert back the one or more thermal mitigation techniques. The temperature can be determined at a plurality of points in the access point and the one or more thermal mitigation techniques can be selected based on which temperature is above the first threshold. There can be multiple temperature thresholds and one of multiple thermal mitigation techniques can be triggered depending on which threshold is crossed.

In a further embodiment, a distributed Wi-Fi network configured to implement local thermal control at various nodes therein includes a plurality of access points connected to one another forming the distributed Wi-Fi network; wherein each of the plurality of access points is configured to determine temperature associated with one or more radios operating therein; responsive to the temperature exceeding a first threshold, perform one or more thermal mitigation techniques to modify operating conditions of the one or more radios; and, responsive to the temperature being lower than a second threshold, revert back the one or more thermal mitigation techniques.

In an embodiment, a method of cloud-based thermal control of an access point performed by a cloud-based controller includes periodically obtaining temperature measurements from the access point including one or more radio chips operating therein; responsive to the temperature exceeding a first threshold, causing one or more thermal mitigation techniques to modify operating conditions of the one or more radio chips; and, responsive to the temperature being lower than a second threshold, causing reversion back of the one or more thermal mitigation techniques. The one or more thermal mitigation techniques can include any of reducing a Multiple Input, Multiple Output (MIMO) dimension on one or more of the one or more radio chips; turning off one of the one or more radio chips; reducing power of a transmitter associated with one of the one or more radio chips; and controlling a duty cycle of the transmitter associated with one or more of the one or more radio chips.

The access point can be part of a multi-node Wi-Fi network, and wherein the one or more thermal mitigation techniques can include changing a topology of the multi-node Wi-Fi network to adjust the operating conditions of the access point. The topology can be chosen to result in one or more of fewer children connected to the access point, children with lower traffic load, and children at a shorter range from the access point. The access point can be part of a multi-node Wi-Fi network, and wherein the one or more thermal mitigation techniques can include steering clients associated with the access point to adjust the operating conditions of the access point. The access point can be part of a multi-node Wi-Fi network, and wherein the one or more thermal mitigation techniques can include band steering clients associated with the access point between the one or more radios.

The access point can be part of a multi-node Wi-Fi network, and the method can further include determining the one or more thermal mitigation techniques based on network operating conditions in the multi-node Wi-Fi network and a performance metric. The performance metric can include maximizing throughput, wherein the throughput factors one or more of a total throughput to all clients, the throughput to a slowest client, and a weighted throughput among all clients. The performance metric can be quality based including one or more of consistency of throughput throughout the multi-node Wi-Fi network, latency minimization, and jitter minimization.

The method can further include logging the temperature measurements; and analyzing historical temperature measurements for one or more of identifying values for the first threshold and the second threshold; determining product lifetime of the access point; informing design of new access points; and identifying manufacturing defects. The access point can be part of a multi-node Wi-Fi network, and the method can further include performing an optimization of the multi-node Wi-Fi network subsequent to the causing one or more thermal mitigation techniques to compensate therefor. The determining of the temperature can be based on observation of duty cycle.

In another embodiment, a cloud-based controller configured to perform thermal control of an access point includes a network interface communicatively coupled to the access point; one or more processors communicatively coupled to the network interface; and memory storing instructions that, when executed, cause the one or more processors to periodically obtain temperature measurements from the access point including one or more radio chips operating therein; responsive to the temperature exceeding a first threshold, cause one or more thermal mitigation techniques to modify operating conditions of the one or more radio chips; and, responsive to the temperature being lower than a second threshold, cause reversion back of the one or more thermal mitigation techniques. The one or more thermal mitigation techniques can include any of reducing a Multiple Input, Multiple Output (MIMO) dimension on one or more of the one or more radio chips; turning off one of the one or more radio chips; reducing power of a transmitter associated with one of the one or more radio chips; and controlling a duty cycle of the transmitter associated with one or more of the one or more radio chips.

The access point can be part of a multi-node Wi-Fi network, and wherein the one or more thermal mitigation techniques can include changing a topology of the multi-node Wi-Fi network to adjust the operating conditions of the access point. The access point can be part of a multi-node Wi-Fi network, and wherein the one or more thermal mitigation techniques can include steering clients associated with the access point to adjust the operating conditions of the access point. The access point can be part of a multi-node Wi-Fi network, and wherein the one or more thermal mitigation techniques can include band steering clients associated with the access point between a plurality of radios. The access point can be part of a multi-node Wi-Fi network, and the memory storing instructions that, when executed, can further cause the one or more processors to determine the one or more thermal mitigation techniques based on network operating conditions in the multi-node Wi-Fi network and a performance metric. The access point can be part of a multi-node Wi-Fi network, and the memory storing instructions that, when executed, can further cause the one or more processors to perform an optimization of the multi-node Wi-Fi network subsequent to the causing one or more thermal mitigation techniques to compensate therefor.

In a further embodiment, a Wi-Fi network controlled by a cloud-based controller includes one or more access points each including one or more radios; wherein the cloud-based controller is configured to periodically obtain temperature measurements from the one or more access points; responsive to the temperature exceeding a first threshold in an access point of the one or more access points, cause one or more thermal mitigation techniques to modify operating conditions of the one or more radio in the access point; and, responsive to the temperature being lower than a second threshold, cause reversion back of the one or more thermal mitigation techniques.

In an embodiment, a method of optimizing a distributed Wi-Fi network considering thermal management of a plurality of access points in the distributed Wi-Fi network includes periodically obtaining temperature measurements from the plurality of access points; performing an optimization to configure the distributed Wi-Fi network with the temperature measurements as thermal inputs used in the optimization, wherein the optimization determines configuration parameters including one or more of a topology of the distributed Wi-Fi network, band and channel of each hop in the topology, and which clients associate with which access point on which band; and providing the configuration parameters to the distributed Wi-Fi network for implementation thereof. The configuration parameters can include adjustments to one or more radio chips for thermal mitigation based on the thermal constraints, and wherein the adjustments can include any of reducing a Multiple Input, Multiple Output (MIMO) dimension on one or more radio chips; turning off the one or more radio chips; reducing power of a transmitter associated with the one or more radio chips; and controlling a duty cycle of the transmitter associated with the one or more radio chips.

The optimization can adjust topology related parameters of the distributed Wi-Fi network to compensate for the adjustments to the configuration parameters for thermal mitigation. The optimization can utilize an objective function which factors the thermal constraints of each of the plurality of access points with throughput and/or quality. The optimization can have an input loads of each client and an output of the configuration parameters including client assignments based on the thermal constraints. The input loads of each client can be anticipated based on historical measurements. The optimization can determine the configuration parameters to change the topology based on the thermal constraints such that access points operating at high temperatures have reduced load. The reduced load can be one or more of fewer children, children with lower traffic load, and children at closer range to the access point.

The optimization can determine the configuration parameters to steer clients to access points based on the thermal constraints such that access points operating at high temperatures have reduced load. The reduced load can be one or more of fewer children, children with lower traffic load, and children at closer range to the access point. The optimization can determine the configuration parameters based on network operating conditions and a performance metric, wherein the performance metric can include one or more of a total throughput to all clients, the throughput to a slowest client, and a weighted throughput among all clients The optimization can determine the configuration parameters based on network operating conditions and a performance metric, wherein the performance metric can include one or more of consistency of throughput, latency minimization, and jitter minimization. The optimization can utilize the thermal constraint which is specific to each radio to implement a thermal mitigation technique for each radio. The optimization can ignore the thermal constraint of each access point until the thermal constraint exceeds a threshold and then the thermal constraint is treated as a dominant factor in the optimization for that access point. The temperature measurements can be determined based on a transmit duty cycle of one or more radios.

In another embodiment, a cloud-based controller configured to control a Wi-Fi network with a plurality of access points includes a network interface communicatively coupled to the Wi-Fi network; one or more processors communicatively coupled to the network interface; and memory storing instructions that, when executed, cause the one or more processors to periodically obtain temperature measurements from the plurality of access points; perform an optimization to configure the distributed Wi-Fi network with the temperature measurements as thermal inputs used in the optimization, wherein the optimization determines configuration parameters including one or more of a topology of the distributed Wi-Fi network, band and channel of each hop in the topology, and which clients associate with which access point on which band; and provide the configuration parameters to the distributed Wi-Fi network for implementation thereof.

The configuration parameters can include adjustments for thermal mitigation based on the thermal constraints, and wherein the adjustments can include any of reducing a Multiple Input, Multiple Output (MIMO) dimension on the one or more radio chips; turning off the one or more radio chips; reducing power of a transmitter associated with the one or more radio chips; and controlling a duty cycle of the transmitter associated with the one or more radio chips. The optimization can adjust topology related parameters of the distributed Wi-Fi network to compensate for the adjustments to the configuration parameters for thermal mitigation. The optimization can determine the configuration parameters to change the topology based on the thermal constraints such that access points operating at high temperatures have reduced load.

In a further embodiment, a Wi-Fi network controlled by a cloud-based controller includes one or more access points each including one or more radios; wherein the cloud-based controller is configured to periodically obtain temperature measurements from the plurality of access points; perform an optimization to configure the distributed Wi-Fi network with the temperature measurements as thermal inputs used in the optimization, wherein the optimization determines configuration parameters including one or more of a topology of the distributed Wi-Fi network, band and channel of each hop in the topology, and which clients associate with which access point on which band; and provide the configuration parameters to the distributed Wi-Fi network for implementation thereof.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to thermal management of wireless access points including local thermal management, cloud-based thermal management, and thermal management based on optimization and operation in a distributed Wi-Fi network. The objective of the present disclosure is for thermal management in access points allowing small form-factors and aesthetic designs, preventing overheating and without requiring reduced performance or reduced hardware. Generally, the systems and methods detect when access points are nearing overheating and alter their operation so as to minimize the reduction of performance in the network while reducing power consumption.

Distributed Wi-Fi System

Figure 1:
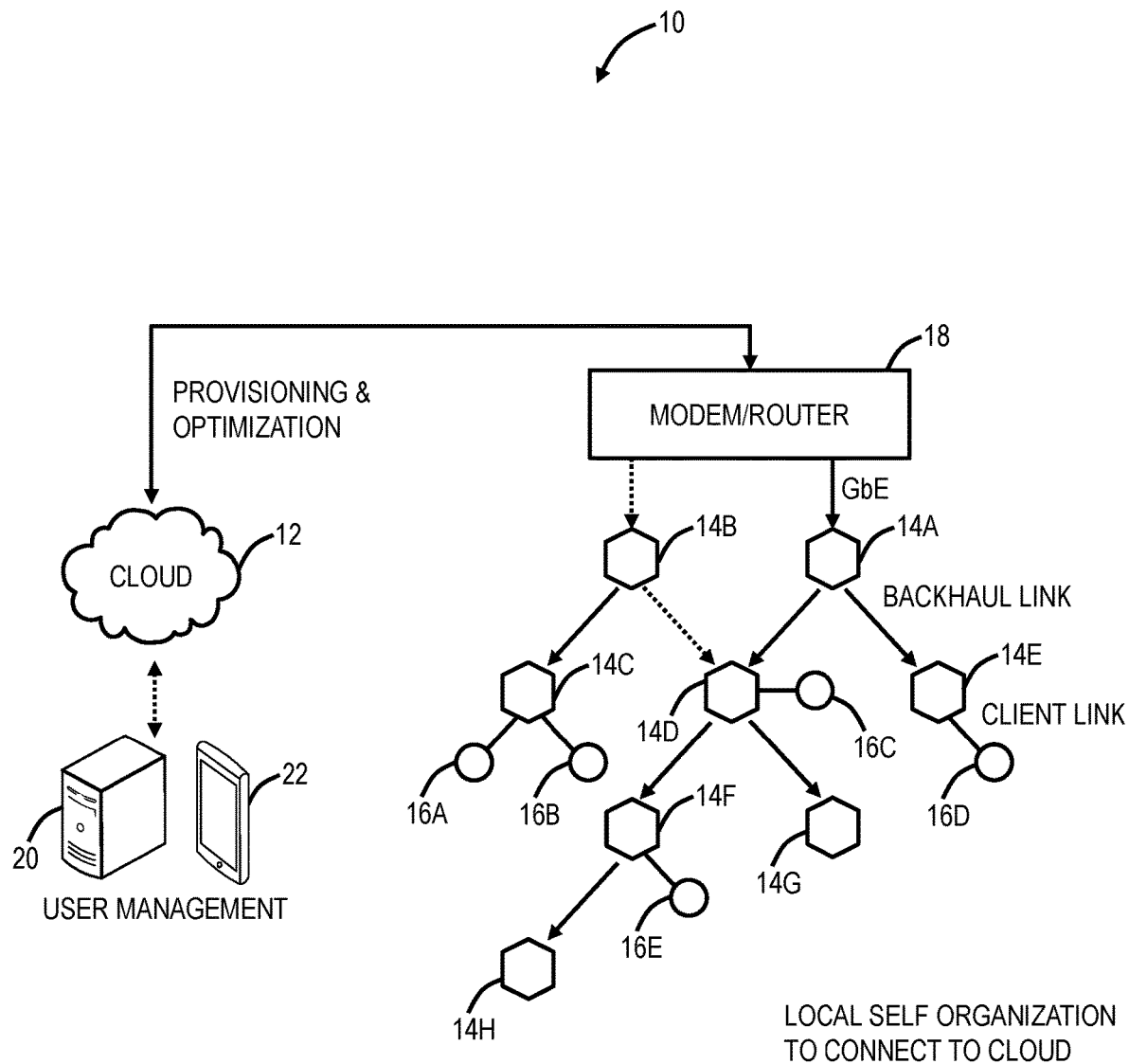
FIG. 1 is a network diagram of a distributed Wi-Fi system with cloud-based control.

FIG. 1 is a network diagram of a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 can be a cloud-based controller configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A can have a gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
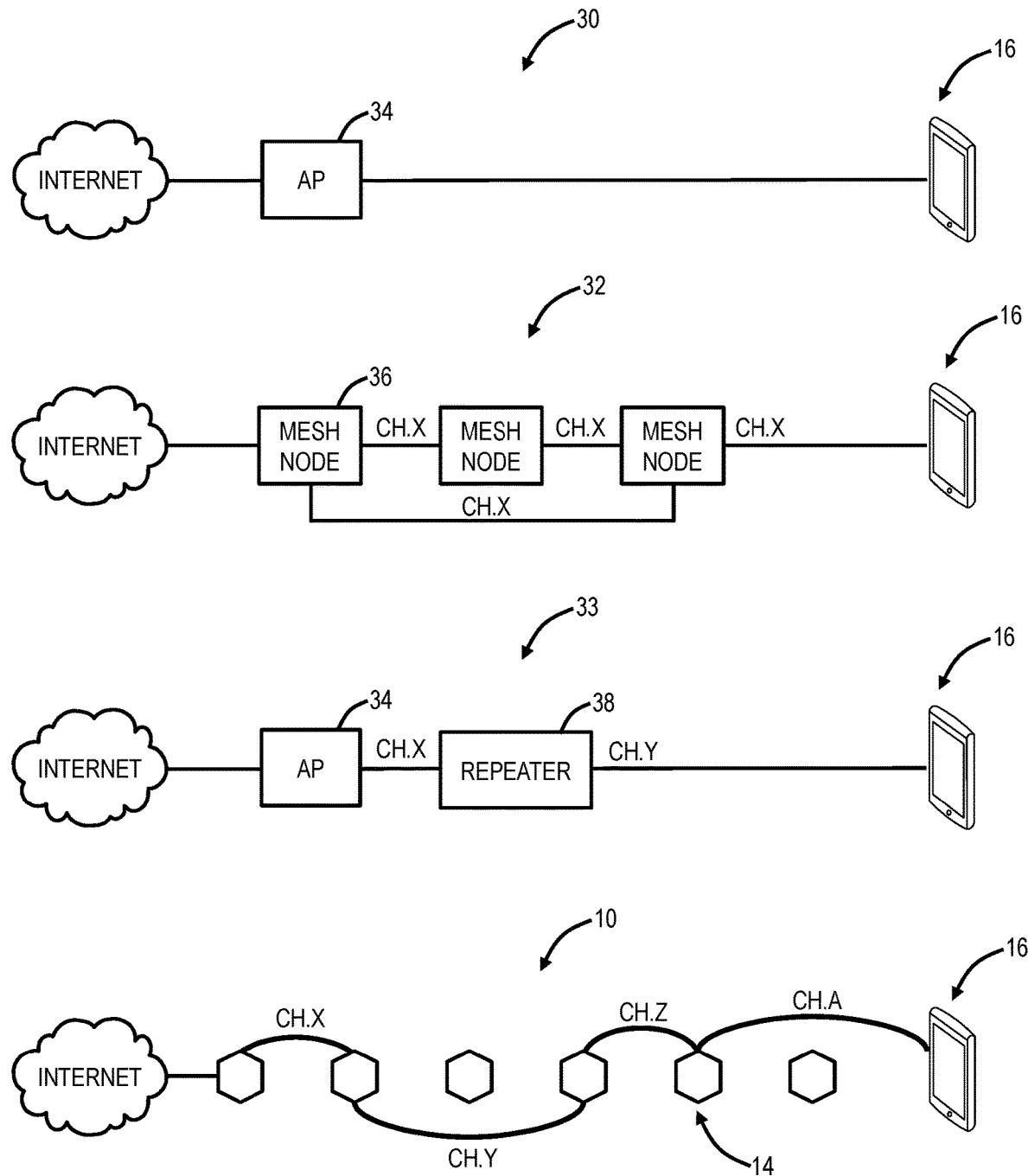
FIG. 2 is a network diagram of differences in operation of the distributed Wi-Fi system of FIG. 1 relative to a conventional single access point system, a Wi-Fi mesh network, and a Wi-Fi repeater system.

FIG. 2 is a network diagram of differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Ch. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an aspect, the servers 20 in the cloud 12 are configured to optimize channel selection for the best user experience.

Of note, the systems and methods described herein related to thermal management contemplate operation through any of the distributed Wi-Fi system 10, the single access point system 30, the Wi-Fi mesh network 32, and the Wi-Fi repeater network 33. There are certain aspects of the systems and methods which require multiple device Wi-Fi networks, such as the distributed Wi-Fi system 10, the Wi-Fi mesh network 32, and the Wi-Fi repeater network.

Access Point

Figure 3:
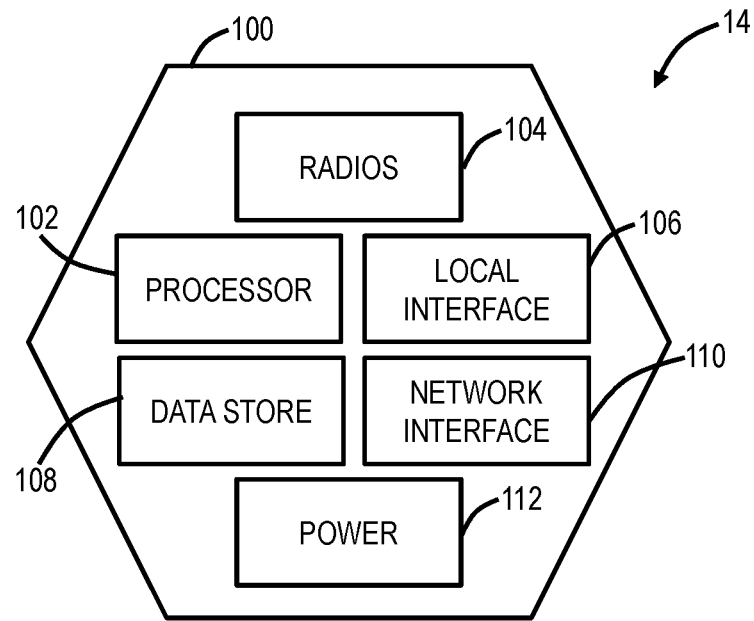
FIG. 3 is a block diagram of functional components of the access point in the distributed Wi-Fi system of FIG. 1.

FIG. 3 is a block diagram of functional components of the access point 14 (also referred to as a wireless router) in the distributed Wi-Fi system 10. The access point 14 includes a physical form factor 100 which contains a processor 102, one or more radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein. In an embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. Of note, the form factor 100 can be compact such that there is little room for large heatsinks or fans. The systems and methods described herein provide techniques for thermal management of the access point 14.

The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes one or more radios to support different links, i.e., backhaul links and client links. The optimization 70 determines the configuration of the radios 104 such as bandwidth, channels, topology, etc. In an embodiment, the access points 14 support dual-band operation simultaneously operating 2.4 GHz (2.4G) and 5 GHz (5G) 2×2 Multiple Input, Multiple Output (MIMO) 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an embodiment, all of the access points 14 in the distributed Wi-Fi system 10 include the network interface 110. In another embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
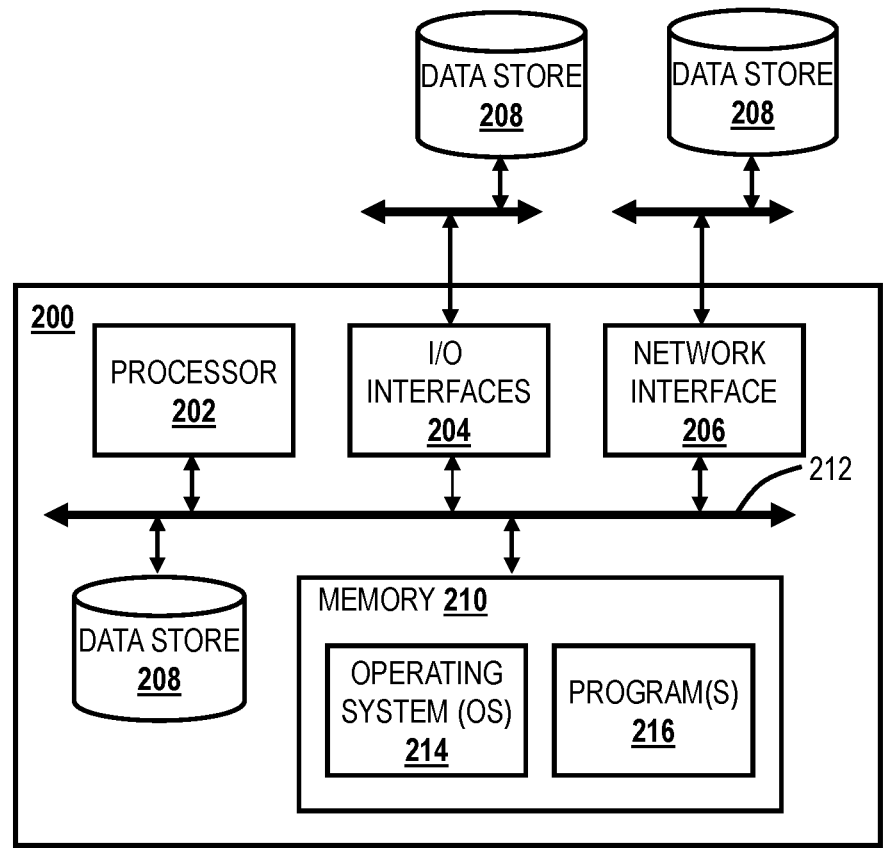
FIG. 4 is a block diagram of functional components of a server, a Wi-Fi client device, or a user device which may be used with the distributed Wi-Fi system of FIG. 1.

FIG. 4 is a block diagram of functional components of the server 20, the Wi-Fi client device 16, or the user device 22 which may be used with the distributed Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Configuration and Optimization Process for the Distributed Wi-Fi System

Figure 5:
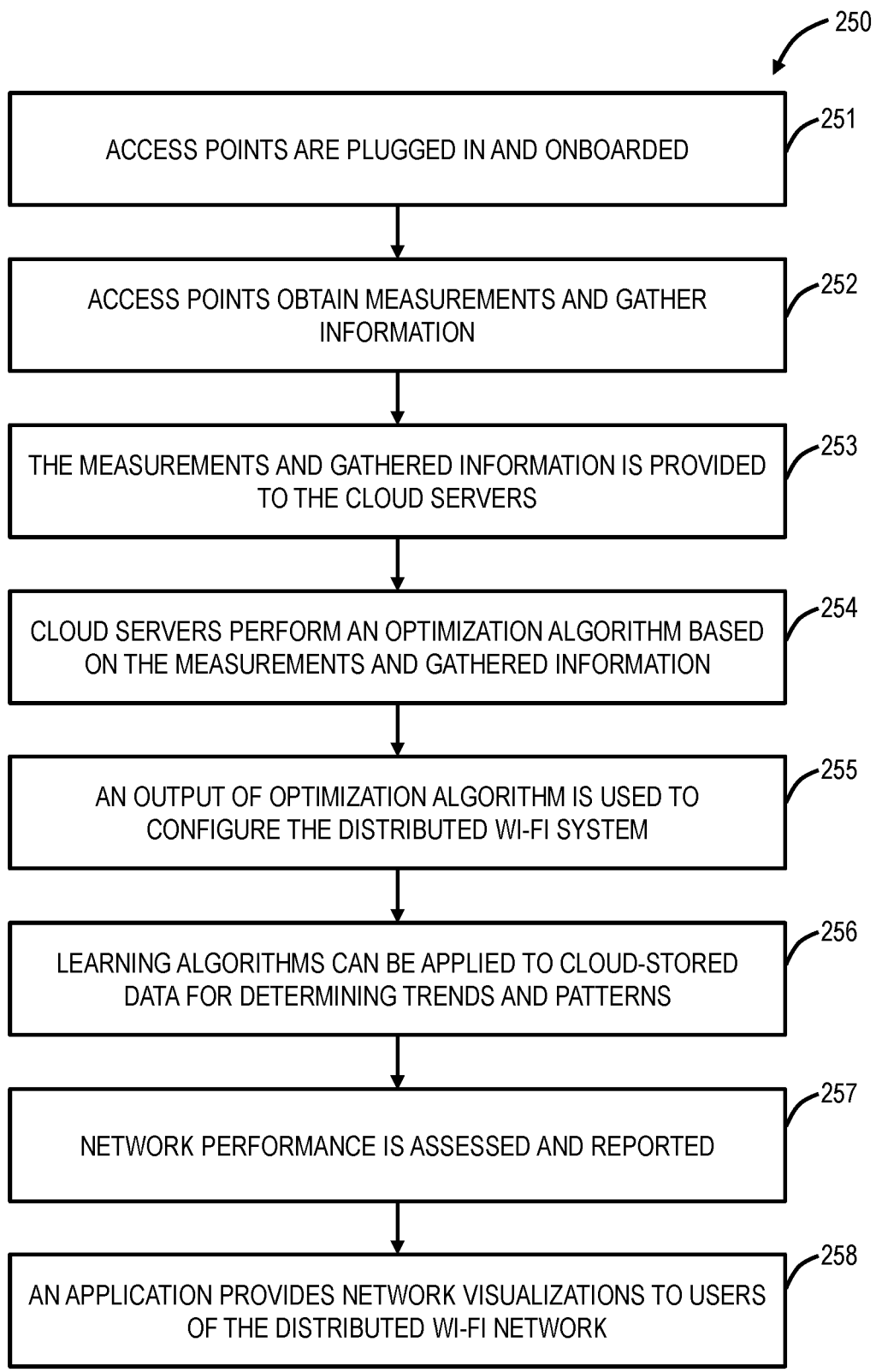
FIG. 5 is a flowchart of a configuration and optimization process for the distributed Wi-Fi system of FIG. 1.

FIG. 5 is a flowchart of a configuration and optimization process 250 for the distributed Wi-Fi system 10. Specifically, the configuration and optimization process 250 includes various steps 251-258 to enable efficient operation of the distributed Wi-Fi system 10. These steps 251-258 may be performed in a different order and may be repeated on an ongoing basis, allowing the distributed Wi-Fi system 10 to adapt to changing conditions. First, each of the access points 14 are plugged in and onboarded (step 251). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 251 ensures a newly installed access point 14 connects to the distributed Wi-Fi system 10 so that the access point can receive commands and provide data to the servers 20. The onboarding step 251 can include configuring the access point with the correct Service Set Identifier (SSID) (network ID) and associated security keys. In an embodiment, the onboarding step 251 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 252). The information gathered can include signal strengths and supportable data rates between all nodes as well as between all nodes and all Wi-Fi client devices 16. Specifically, the measurement step 252 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 252 is provided to the servers 20 in the cloud 12 (step 253). The steps 251-253 can be performed on location at the distributed Wi-Fi system 10.

These measurements in steps 252, 253 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers"). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 254). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 255). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 256). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 257). Eighth, an application (such as a mobile app operating on the user device 22) can provide a user visibility into the network operation (step 258). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 520 is described herein with reference to the distributed Wi-Fi system 10 as an embodiment. Those skilled in the art will recognize the configuration and optimization process 250 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Figure 6:
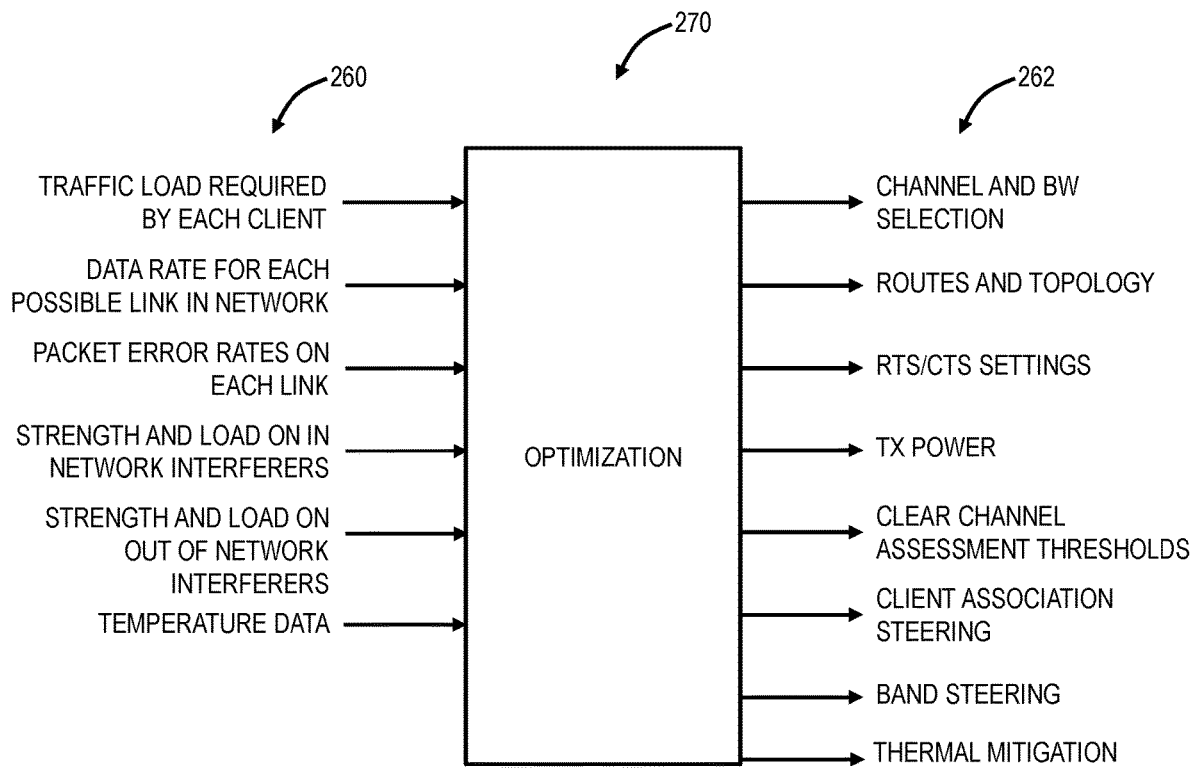
FIG. 6 is a block diagram of inputs and outputs to an optimization as part of the configuration and optimization process of FIG. 5.

FIG. 6 is a block diagram of inputs 260 and outputs 262 to an optimization 270. The inputs 260 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 270 include, for example, channel and bandwidth (BW) selection, routes and topology, Request to Send/Clear to Send (RTS/CTS) settings, Transmitter (TX) power, clear channel assessment thresholds, client association steering, and band steering.

Additionally, one aspect of the optimization 270 can also include thermal management, such as client association steering away from overheating nodes allowing such nodes to reduce power and load.

Thermal Management Process

Again, in various embodiments, the present disclosure relates to thermal management of the access points 14, the access points 34, the mesh nodes 36, the repeater 38, and the like (collectively referred to herein as access points 14). A large portion of the peak power dissipated in the access points 14 comes from the RF power amplifiers. Overheating can occur when any or all of the radios 104 spend a high percentage of the time transmitting. This can be exacerbated if the Ethernet chip (in the network interface 110) in the access point 14 is also actively dissipating power.

Figure 7:
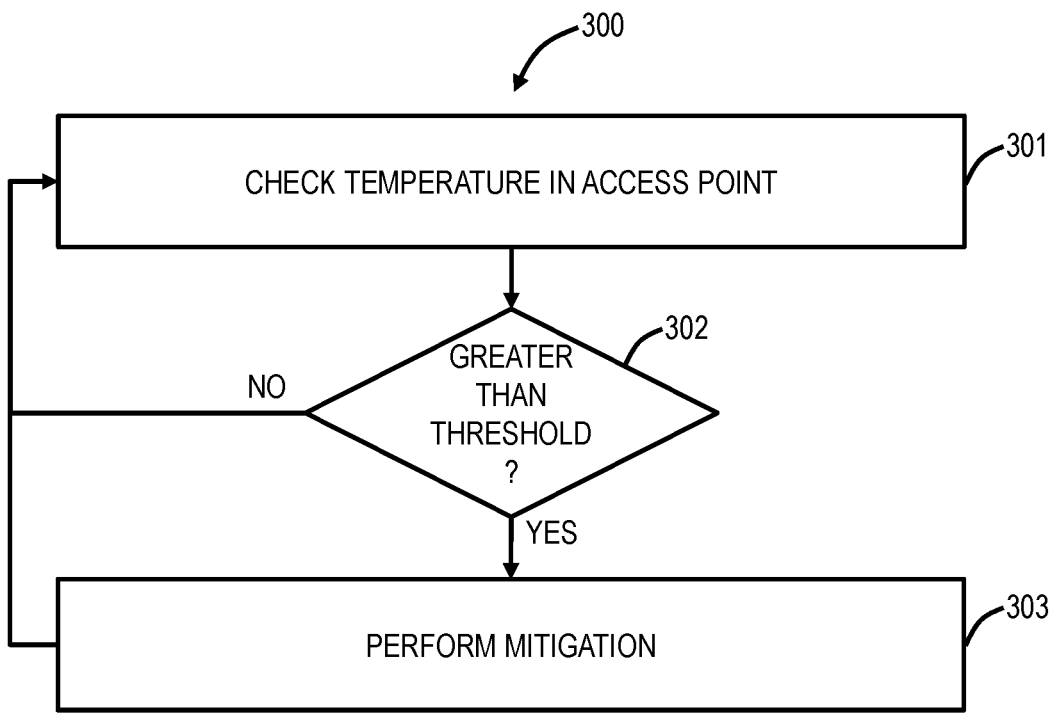
FIG. 7 is a flowchart of a thermal management process.

FIG. 7 is a flowchart of a thermal management process 300. Note, the thermal management process 300 can be performed locally by the access point 14, remotely via the cloud 12, and/or as part of an optimization 270 through the cloud 12. The thermal management process 300 includes modifying operating conditions of the access point 14 to reduce power dissipation within the access point 14. The thermal management process 300 includes checking the temperature in the access point 14 (step 301). For example, the thermal management process 300 can include checking the temperature on both 5 GHz and 2.4 GHz radio chips in the access point 14, the network interface 110, etc. Generally, any temperature sensor that is in the access point 14 can be checked and factored into the decision to enable a temperature mitigation function. If the temperature exceeds a programmable threshold (step 302), mitigation can commence (step 303). Note, the temperature can be based on each of the radio chips, the network interface 110, etc. or it can be the overall temperature in the access point 14.

The mitigation process can be dropping transmissions of one or both of the 2.4G and 5G bands to a single stream (1x TX configuration). However, a variety of mechanisms can be employed as described herein. As a fallback, complete shutdown of the access point 14 can be used if none of the mitigation processes available are sufficient to prevent an excessive temperature. Such a shutdown can be in the context of the optimization 270 in the distributed Wi-Fi system 10 which can, in turn, compensate for the shutdown. The throttling will be reset (turned off) if the temperature of both chips drops below a particular temperature threshold. All temperature related actions (throttling on, off, etc.) can be logged to the cloud 12. In addition, periodic measurements of the temperature can be sent to the cloud 12 in step 252.

Thermal Mitigation Techniques

Example thermal mitigation techniques can include one or more of turning off radios, reduce the MIMO transmit dimension on the 2.4G and/or 5G radios, reduce transmit power, software-based transmit duty cycle, a quiet timer for duty cycle control, changing network topology, and the like.

For turning off the radios 104, this has the advantage of significantly lowering power consumption such that the access point 14 cannot overheat when in this state. For example, in the distributed Wi-Fi system 10, the access point 14 by far most likely to overheat is the gateway or "master" node, as it is using Ethernet to connect to the modem/router 18, and can have close to a 100% Tx duty cycle on both the 2.4G and 5G radios. All other nodes are not likely to have Ethernet running, and must spend at least some percentage of the time receiving the data they are forwarding on, so they cannot operate both the radios 104 at near 100% Tx. Having the master node (e.g., the access point 14A) drop to 5G only is acceptable as the Wi-Fi client devices 16 and the access points 14 connected at 2.4G can either reconnect at 5G or can connect to a different access point 14 at 2.4G. And, the master node is likely using 5G to backhaul into the distributed Wi-Fi system 10 in the great majority of cases. The net of the very rare occurrence, together with the "survivability" of shutting off 2.4G at the node, make this approach workable. However, it does interact with the network topology, so turning the mode on and off is complex, and needs to be addressed with the cloud 12 regarding topology optimization. In addition, a careful hysteresis/load detection system needs to be devised as flipping in and out of this mode is disruptive, and needs to be minimized.

With respect to reducing the MIMO transmit dimension, this is a more graceful adaptation than turning off a radio. However, dropping just one of the two radios to 1×1 from 2×2 may not be sufficient to guarantee overheating will not occur. Dropping the 5G radio to 1×1 causes more loss of capacity than turning the 2G radio off completely, so this approach is not optimal for preserving capacity in the Wi-Fi network (and particularly bad at the master/gateway node). Also, this approach requires some software to force the driver to queue packets with single stream data rates, and force a single stream Tx chain mask (disable Cyclic Delay Diversity (CDD) type transmissions which put out a single stream from both chains). Switching to single chain reception as well as single chain transmission would save even more power by reducing the power when in a receive mode. However, there are additional complications if dropping to a single chain reception. Once the access point 14 has reduced its MIMO receive dimension, it will not be able to receive packets from Wi-Fi client devices 16 at a MIMO dimension that is larger than what the access point 14 dropped down to. The MIMO dimension the access point 14 can handle is provided to the Wi-Fi client device 16 when the Wi-Fi client device 16 associates to the access point 14. Therefore, if this value is changed dynamically, the Wi-Fi client device 16 will not be aware that the access point 14 can no longer receive full dimension MIMO packets. An access point 14 changing its MIMO dimension would, therefore, need to notify Wi-Fi client devices 16 of the switch. Another approach would be to trust Wi-Fi client devices 16 to adapt well when no dual stream packets succeed. Most Wi-Fi client devices 16 have rate adaptation algorithms that will sense that the full MIMO dimension is not working (the clients will presume it is because of a poor channel) and drop to a lower MIMO dimension automatically.

With respect to reducing transmitter power, reducing the transmitter power on both bands sufficiently to guarantee the device cannot overheat can be effective, but may significantly degrade the throughput on both bands (again a problem for capacity in 5G), and perhaps shorten the range to the point that Wi-Fi client devices 16 and access points 14 can no longer connect. In addition, to get significant power savings, it might require changing the bias currents in the power amplifiers as the requested transmitter power is varied. This would require a change to the driver, and would require significant measurement and characterization of the bias levels required for a given output power level over voltage, temperature, chip to chip, etc.

With respect to the software-based transmit duty cycle, since much of the power comes from the power amplifiers which are used only during transmission, if the duty cycle (percentage of time) of transmission is limited, the temperature of the access point 14 can be reduced. The transmit duty cycle can be limited at a relatively high level in the networking stack, or at the very lowest level as the packets are being delivered to the hardware to be transmitted. While implementation of the high-level software-based duty cycle limitation is less complex, depending on the design of the software system, it may not be effective in controlling the duty cycle. If the software queue inside the driver is quite deep and the data rate is unknown, reliable control of the duty cycle of the radio is not possible. In addition, Transmission Control Protocol (TCP) performance drops quickly when this technique is applied. Another option would be to use the off-channel scanning mechanism to gate the transmitter effectively. When the radio is sent off-channel to scan, it does not transmit, so the transmit duty cycle is reduced. However, off-channel scanning takes the driver away from the channel for both transmit and receive, so this approach can have a serious detriment to network performance.

With respect to a quiet timer for duty cycle control, this approach advantageously controls the queue at the very head through hardware, such as through the IEEE 802.11h quiet time mechanism. This allows reliable control of the Tx duty cycle regardless of the data rate or queue depth. This approach has many advantages. This approach can be implemented in a relatively fine-grained fashion (a range of duty cycles can be supported) so that the throughput/temperature tradeoff can be fine-tuned to optimize performance. This approach does not break any connections, so no topology change is required, and no significant software changes are required in the cloud 12. There is no need to worry about leaving Wi-Fi client devices 16 out of range, or permanently breaking the ability to have access points 14 connect as it does not affect range or band availability, it just reduces throughput. Because the mode switching can be quick and with only localized throughput effect, this approach can move between modes rapidly, allowing hysteresis to be just based on the temperature of the access point, nothing more sophisticated. However, many chipsets do not allow sufficient control of the quiet time mechanism to achieve full transmit duty cycle control. Finally, going into quiet time gates the sending of Acknowledgments (ACKs). This may create a problem for uplink traffic or for TCP ACKs coming back from Wi-Fi client devices 16. Clear-to-Send (CTS) to self is needed, and the quiet periods need to be short (<30 ms) to prevent this, at which point the interval between quiet times must be short to create a significant reduction in duty cycle.

With respect to the network topology, in the distributed Wi-Fi system 10 or the Wi-Fi mesh network 32, the topology determines which access point 14 connects to which other access points 14. Some access point 14 may be more central in a given topology, and thereby need to carry a higher load of traffic. In particular, an access point 14 may be placed in a "central" role in which it forwards traffic to several other access points 14, each with a set of Wi-Fi client devices 16. A central access point 14 of this type may have a high transmit duty cycle, particularly if the range to some of the downstream access points 14 is large, forcing the use of lower data rates to cover the distance. Moving the same amount of traffic at lower data rates inherently makes the transmit duty cycle higher. Thus, the cloud 12 can consider the temperature as a parameter for optimization, e.g., moving higher temperature devices out of the central role, etc. For example, higher temperature access points 14 can be optimized to have fewer children to which they must transmit traffic to, to have children with a lower traffic load, and to have fewer children that are at long range.

Also, the cloud 12 can perform client steering to determine which Wi-Fi client devices 16 associate with the access points 14 in the distributed Wi-Fi system 10. In an embodiment, the Wi-Fi client devices 16 can be steered such that access points 14 which require thermal mitigation have fewer Wi-Fi client devices 16, have Wi-Fi client devices 16 with lower loads, have Wi-Fi client devices 16 closer in distance, etc. Also, the cloud 12 can perform band steering (2.4G vs. 5G) to determine which band the Wi-Fi client devices 16 connect. The cloud 12 can perform band steering of the Wi-Fi client devices 16 from a radio 104 that is overheating to a radio 104 which is not overheating within the access point 14 such that the overheating radio 14 has fewer Wi-Fi client devices 16 connected to it, has Wi-Fi client devices 16 that have lower loads connected to it, has Wi-Fi client devices 16 that are closer to the access point 14 connected to it, etc.

Of course, a shutdown or reboot can be a fallback method to reduce temperature if other approaches prove insufficient to limit the temperature.

Detecting Overheating

Various measurements are taken by the access point 14 to determine whether thermal mitigation is required. Step 301 includes measurement of temperature within the access point 14. The temperature can be the ambient temperature in the access point 14, the case temperature of the access point 14, a die temperature of a component such as the radio 104 in the access point 14, etc. For example, multiple measurements can be performed on multiple components, and specific mitigation can be taken depending on which component has an excess temperature.

To detect that the access point 14 is overheating, a process can be implemented to map thermal Analog-to-Digital Converter (ADC) readings to temperatures. For example, each radio chip and Ethernet chip can have temperature diodes whose voltage is acquired by a temperature ADC. The output of the ADC must be translated to an absolute temperature based on calibration data. This can be performed via a lookup table (LUT) that maps the ADC output to absolute temperature. A different lookup table may be required for each chip in the access point 14. Whenever a temperature measurement is performed, the driver will sample the temperature ADC and will look up/interpolate the actual temperature from the values in the lookup table.

In an embodiment, three thresholds can be defined for action to reduce the power consumption. The action can be taken if the temperature measurement on either of the chips (2.4G and 5G chip) exceeds the given threshold. All thresholds can be programmable. The three thresholds and their actions are:

| Threshold | Action |
|---|---|
| High | Notify the cloud 12 to change the mode of operation to reduce the temperature. |
| Too High | Reset the access point 14. This is an emergency fallback to ensure the device does not damage itself by overheating. |
| Low | If the temperature in the access point 14 falls below the "Low" threshold, resume normal operation and inform the cloud that normal operation had been reinstated such that future optimizations can be done considering the device to be fully capable. |

While three example thresholds are described above, more thresholds could be used to trigger various degrees or processes of thermal mitigation. Some processes of thermal mitigation can be controlled in a smooth continuum. For example, the transmit duty cycle could be limited anywhere from 100% to 0% duty cycle. Such a thermal mitigation process could be controlled in a continuous way by a feedback loop. For example, a maximum allowable temperature could be maintained over time by continuously adjusting the duty cycle in fine steps so as to allow the maximum possible performance while maintaining an acceptable temperature.

The thermal management process 300 can use multiple temperature thresholds to change or add thermal mitigation or change the amount of thermal management (e.g., what the duty cycle is limited to). The thermal mitigation can be implemented in a control loop that varies in a continuous, smooth fashion for the mitigation technique. For example, a control loop could include the duty cycle of the transmitter is varied continuously to maintain the maximum allowable temperature in the access point 14.

The thermal management process 300 can be stopped based on a measurement of temperature within the access point, e.g., when the temperature falls below a threshold such as the "Low" threshold. Also, the threshold for stopping is lower than the threshold for starting the thermal management process 300 so as to create hysteresis in the thermal management control. The thermal management process 300 can be triggered by a measurement of the duty cycle of the access point 14 and the thermal management process 300 can be stopped based on a measurement of the duty cycle of the access point 14. Control based on the duty cycle itself would alleviate the need for temperature sensors, but would require a-priori knowledge or a calibration of how the duty cycle and the temperature of the device vary.

Reacting to Thermal Overheating

Preferably, when the temperature exceeds the "High" temp threshold, transmission must be made such that only one transmit power amplifier and transmit Tx chain is enabled for the access point 14. This should be done on both the 2.4G and 5G band. During this time, data packets must be queued specifying only single stream data rates. In addition, CDD (the transmission of a single stream from two power amplifiers) must be disabled.

It is preferred to leave the receiver in two chain reception mode during thermal throttling. The benefit of dropping to a single chain on Rx is not great. The condition of thermal overheating occurs only under high transmit duty cycle, so only a fraction of the time is spent in reception anyway. The power consumption in reception, even of two streams, is well below the power consumption while transmitting, so fractionally the saving from dropping to one receive stream is minor. Notifying the Wi-Fi client devices 16 of a change in the acceptable number of streams require extra work and might require re-associating the Wi-Fi client devices 16. If not notified, there may be Wi-Fi client devices 16 whose rate adaptation algorithms do not agree well with having all two stream packets fail no matter what the data rate. However, this would still be functional, as all the Wi-Fi client devices 16 must be able to deal with a channel with insufficient channel diversity to handle two streams. It is just a matter of how gracefully devices handle that situation.

Any of the thermal mitigation processes described herein can be used when reacting to the device overheating. Multiple processes can be applied at once when even more thermal mitigation is required. The reaction to a threshold being crossed can be a quantized step reaction or can be a closed loop continuous fine-grained control of the thermal management process 300.

Exiting Thermal Mitigation Mode

The third thermal threshold ("Low") can be used to determine that the temperature has dropped sufficiently to clear the single chain transmission throttling. The difference between the "Low" temp threshold and the "High" temp threshold sets a hysteresis band to help keep thermal throttling more stable. However, because thermal throttling can be quickly added or removed, and because it causes only a shift in the capacity/throughput of the network, it is not a large problem if a network oscillates some between different thermal throttling settings. In general, the Low threshold should be chosen low enough that it is not reached just by activating single chain transmit. It should only be crossed if both single chain transmit is activated, and the requested transmit duty cycle drops enough that the access point 14 would not overheat were two chain transmission to be re-enabled.

Cloud Based Control of Thermal Management

The thermal management process 300 can be performed in each access point 14 locally, i.e., both the detection and the selection of the processes used to mitigate overheating can be decided entirely local. An intermediate approach would be to have a central controller operating within one of the access points 14 in each home. This provides some degree of coordination and potentially optimization of the thermal control process with the home. It is still reasonably simple, avoiding the requirement that the network be connected to the outside world. However, numerous additional advantages can be achieved if the decision-making process regarding when to apply thermal management and which process to apply are made in the cloud 12.

The cloud 12 can have a full view of the entire network in a consumer's home, including multiple access points 14. It can even have a broader view, say of an entire apartment complex with all the interactions between Wi-Fi networks in the various apartments. This system-wide knowledge can enable selection of thermal mitigation techniques, including changing topologies and where Wi-Fi client devices 16 are connected that do a better job of preserving performance. Performance can be judged by the net system throughput, by the fairness of throughputs between Wi-Fi client devices 16, by the consistency of throughput, by the latency, or by the jitter in the network. Ideally, the selection is made on a weighted combination of these factors, allowing the thermal mitigation process to be chosen so as to optimize both throughput and quality.

There are other advantages and processes that can be performed in the cloud 12 related to thermal management. Having the processes in the cloud 12 allows easy modification of the algorithm without having to update the firmware on all the access points 14 in the field. Instead, a single update to the software in the cloud 12 can change the behavior of all (or any subset) of the access points 14 deployed in the field.

If the thermal measurements are moved to the cloud 12, data analysis can be performed to extract the proper thresholds to set at which actions should be taken. Device lifetimes can be estimated by applying a non-linear lifetime weighting factor to each temperature sample and integrating these values over time. Future hardware designs can make use of the temperature data taken from the field, providing much more accurate thermal requirements for those future devices. The amount of heat sinking, fans, venting, and other design factors to control temperature can be optimized on the basis of the measurements in the field of a previous generation of hardware. By examining the temperatures from many devices, and looking for outliers, it is possible to identify devices with certain types of defects. Such devices could be recalled and replaced before the device fails or even potentially causes a hazardous situation.

Two additional thermal related pieces of data should be recorded in the database in the cloud 12—thermal throttling events and regular temperature readings. For a thermal throttling event, each time the thermal throttling is activated or de-activated, those events can be recorded together with the time stamp and the temperature readings from both chips in the radio 104. For regular temperature readings, temperature readings can be taken every 10 seconds (configurable), and the maximum, minimum, and average value across each minute can be determined. For example, 15 minutes (15 sets of data) can be communicated to the cloud 12 every 15 minutes.

Moving measurements regarding power consumption, temperature, duty cycles, and other thermally related parameters to the cloud 12 is relatively straightforward, such as during steps 252-253 in the configuration and optimization process 250. First, the data should be packetized and serialized. Fewer larger transfers are more efficient than many short ones. A limit on this is the desired latency in getting the information to the cloud 12. Well known protocols exist for grouping and transmitting this data, such as Protobuf. Once ready for transport, a variety of Internet Protocol (IP)-based communications protocols could be used to transfer the data. A particularly appropriate technique is Message Queue Telemetry Transport (MQTT), a standard built for the transfer of sensor data to the cloud 12, a good match to temperature and duty cycle measurements, etc.

When the data arrives in the cloud 12, it is desirable to both process it as it flows in, within the data pipeline. Systems such as Spark Streaming can be used for this purpose, allowing sophisticated calculations right as the data flows in. Processed and raw data can then be stored in a database. Any number of well-known industry standard databases would serve equally well for this purpose. Once the data is stored in databases in the cloud 12, data analysis can be performed to extract learning that can inform the algorithms that control temperature. There are a wide variety of data analysis techniques. Tools such as R or Tableau can be used to visualize the data and allow humans to extract trends and behaviors. Machine learning is also applied to establish correlations and extract patterns automatically. In particular, prediction of future temperature or data traffic is helpful in ensuring that any network optimization or configuration will be effective during the next day or longer period of time, reducing the need for frequent disruptive optimizations. There are a wide variety of machine learning tools that can be applied, including linear and non-linear regression, decision tree methods, AREMA, and Bayesian methods that are applied depending on the variable being studied and the values being extracted.

Thermal Management as Part of Network Optimization

While having the thermal management process 300 controlled from the cloud 12 provides tremendous advantages, even greater benefit can be obtained if thermal management is included in the optimization 270 of the network. For example, cloud-based optimization of the distributed Wi-Fi system 10 is described in U.S. patent application Ser. No. 15/463,154, filed Mar. 20, 2017, and entitled "OPTIMIZATION OF DISTRIBUTED WI-FI NETWORKS," the contents of which are incorporated by reference. By including the thermal situation as an element in the optimization, the optimization 270 can choose any of the many thermal mitigation techniques in order to meet the thermal constraints of the access points 14 simultaneously, and achieve the highest possible throughput and quality for devices in the network.

A distinction should be made with doing the optimization 270 after the thermal management process 300 is put in place, and actually having the selection of the thermal management solution be part of the optimization 270. While performing the optimization 270 after selecting the thermal management process 300 is better than not optimizing at all, it cannot do as well in achieving a true overall optimum for the network. It also cannot adequately apply some of the thermal mitigation solutions, such as changing the topology, or steering clients to other access points 14 so as to alleviate the load on the access point 14 which is overheating. These techniques require an understanding of how best to change these properties in order to preserve performance while sufficiently reducing the load on the overheating access point 14.

The best way to optimize the network is to jointly consider all aspects of the network in a single optimization 270, including the topology (parent-child relationships of the access points 14), the frequency band and channel selection of each hop, where Wi-Fi client devices 16 connect (which access point 14 and which band), and any thermal mitigation processes to be used on each access point 14. A variety of optimization techniques can be applied to such a problem. Perhaps the best approach is to formulate the problem as a Mixed Integer Linear Programming (MILP) problem. The thermal limit can be added as a hard constraint in the optimization or can be structured as a goal in the objective function if even lower temperatures are desired but not necessary. The objective function that the optimization is attempting to maximize should include the factors of total system throughput (system capacity), individual throughputs perhaps factored by their required load or Quality of Service (QoS) needs, a metric factoring fairness of throughput, joint throughputs when joint loads are present, and the temperature of each of the access points 14. The factoring of the temperature can be non-linear, perhaps very non-linear. An extremely non-linear temperature factoring would be to have the optimizer not care about the temperature at all until it hits a maximum limit, at which point the temperature becomes the far dominant factor. This would have the same effect as having a hard limit as a constraint to the optimization. The factoring of temperature can be done based on the temperature of each chip in the design individually, or by looking at them jointly. Looking at the temperature of individual chips may allow the intelligent application of the thermal mitigation method to just one of the radios in the access point 14, as the overheating chip may have only one of the multiple radios within the access point 14 on it.

The MILP includes an equation that calculates the temperature the access point 14 will reach given its various modes of operation that can be selected (e.g., 1×1 vs. 2×2 MIMO) and the traffic load that the access point 14 is carrying. The optimization 270 needs as an input the anticipated traffic loads that will travel to each of the Wi-Fi client devices 16. With the temperature of the access points 14 modeled in this way, and the temperature appropriately accounted for in the objective function, the solution of the MILP system will naturally result in the highest performance that can be achieved while meeting the temperature requirements. The optimization 270 itself will choose the thermal mitigation scheme and account for the effects of that scheme in the rest of the network.

Once the MILP and objective functions are defined, any number of methods can be used to solve the MILP, including branch and bound methods, relaxation and linearization, subspace searches, and heuristic methods.

Thermal Mitigation Selection

Step 303 includes performing mitigation based on one or more temperatures exceeding a threshold. The thermal management process 300 can include various approaches for deciding which thermal mitigation technique is performed in a particular situation.

The particular thermal mitigation technique for reducing temperature is selected based on network operating conditions and a performance metric. In an embodiment, the performance metric is maximizing the throughput, e.g., the total throughput to all Wi-Fi client devices 16, the throughput to the weakest (slowest) Wi-Fi client device 16, a weighted throughput among Wi-Fi client devices 16, a joint load throughput, and the like. In another embodiment, the performance metric is quality related rather than throughput based. For example, the performance metric can include consistency of throughput, latency minimization, jitter minimization, and the like.

In an embodiment, the decision to implement thermal management and/or what type of thermal mitigation to employ is made locally on the access point 14 based solely on data determined locally. In another embodiment, the decision to implement thermal management and/or what type of thermal mitigation to employ is made in a central controller. For example, the central controller can be located in or on one of the access points 14 in a local network.

Also, the central controller can be located in the cloud 12, such as by the servers 20 as the cloud-based controller. Advantageously, the cloud-based controller can implement the thermal management and thermal mitigation without having to deploy firmware on the access points 14. The temperature measurements taken locally by the access points 14 can be logged to the cloud 12, and data analysis/learning can be performed on these measurements. For example, the data analysis/learning can be used to determine proper thresholds, predict device lifetimes, inform design of future devices, identify manufacturing defects, and the like. Further, locally triggered events and/or local mitigation can also be logged to the cloud 12.

The thermal management and thermal mitigation can be utilized with the optimization 270. In an embodiment, the optimization 270 can be performed subsequent to any thermal mitigation to place the network in the best possible state. In another embodiment, the thermal mitigation can be part of the optimization 270, e.g., thermal mitigation events for various access points 14 can be selected as part of the optimization 270. The optimization 270 chooses the thermal mitigation technique as well as aspects of the topology of the network, including the parent/child relationships of access points 14, the frequency channels used, the access point 14 or band of Wi-Fi client device 16 connections.

Again, the optimization 270 can be formulated to include a constraint on thermal dissipation in the access points 14, e.g., the thermal constraint can be specific to individual radios 104 within the access point 14. The constraint and the optimization 270 factor the expected transmit duty cycle, transmit power, and operating band. The optimization 270 has as an input the anticipated loads of the Wi-Fi client devices 16 (pre-emptive rather than reactive thermal management). The anticipated loads used in the optimization are derived from historical measurements of the load. The optimization 270 is performed by factoring the expected temperature of devices into an optimization objective function that includes other factors such as throughput or quality.

Local Thermal Control of Wireless Access Points

Figure 8:
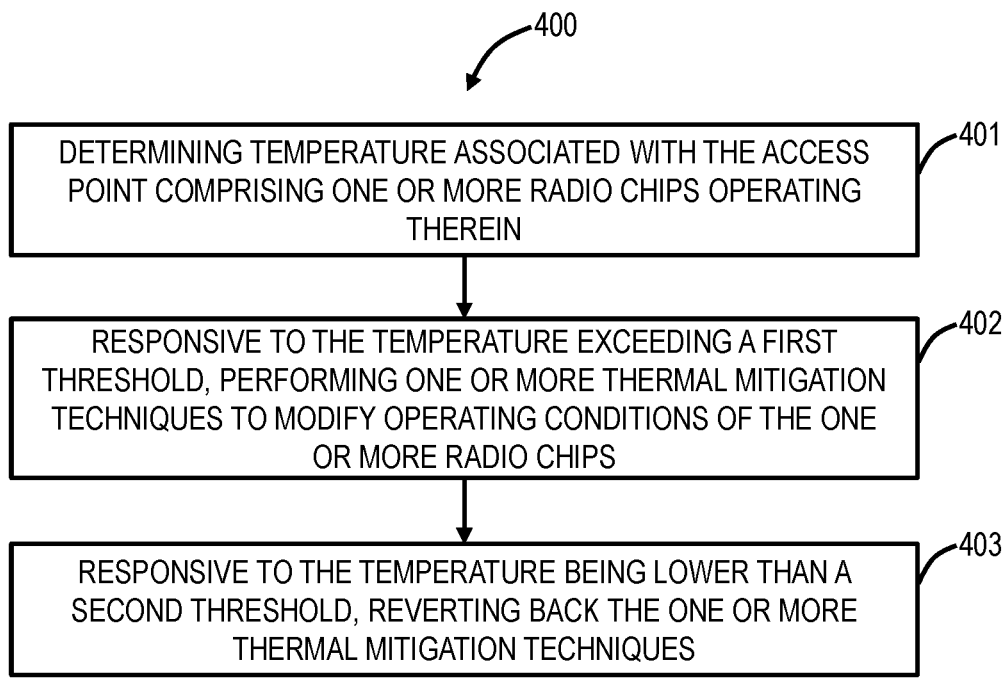
FIG. 8 is a flowchart of a process for local thermal control of an access point.

FIG. 8 is a flowchart of a process 400 for local thermal control of an access point. The process 400 is implemented by any of the access points 14, the access points 34, the mesh nodes 36, the repeater 38, and the like. Of note, the process 400 is implemented locally at each wireless access point. The process 400 includes determining temperature associated with the access point including one or more radio chips operating therein (step 401); responsive to the temperature exceeding a first threshold, performing one or more thermal mitigation techniques to modify operating conditions of the one or more of radio chips (step 402); and, responsive to the temperature being lower than a second threshold, reverting back the one or more thermal mitigation techniques (step 403).

The one or more thermal mitigation techniques can include reducing a Multiple Input, Multiple Output (MIMO) dimension on the one or more radio chips, turning off one of the one or more radio chips, reducing power of a transmitter associated with one of the one or more radio chips, and controlling a duty cycle of a transmitter associated with the one or more radio chips. The duty cycle can be controlled via one of software and IEEE 802.11 quiet time mechanisms. The duty cycle can be controlled between 100% to 0% in a feedback loop which continually adjusts the duty cycle based on the locally determining. The second threshold can be different from the first threshold for a hysteresis band to maintain stability in the local thermal control. The temperature can be determined at each of the one or more radio chips based on reading a temperature diode whose voltage is acquired by an Analog-to-Digital Converter (ADC) and whose output is translated based on calibration data. The temperature can be determined at a plurality of points in the access point, and the one or more thermal mitigation techniques are selected based on which temperature is above the first threshold.

In another embodiment, an access point configured for local thermal control includes one or more radios 104; a processor 102 communicatively coupled to the one or more radios 104 and configured to determine temperature associated with the one or more radios operating therein; responsive to the temperature exceeding a first threshold, perform one or more thermal mitigation techniques to modify operating conditions of the one or more radios; and, responsive to the temperature being lower than a second threshold, revert back the one or more thermal mitigation techniques.

In a further embodiment, a distributed Wi-Fi network 10 configured to implement local thermal control at various nodes therein includes a plurality of access points 14 connected to one another forming the distributed Wi-Fi network 10; wherein each of the plurality of access points 14 is configured to determine temperature associated with one or more radios operating therein; responsive to the temperature exceeding a first threshold, perform one or more thermal mitigation techniques to modify operating conditions of the one or more radios; and, responsive to the temperature being lower than a second threshold, revert back the one or more thermal mitigation techniques.

Cloud-Based Thermal Control of Wireless Access Points

Figure 9:
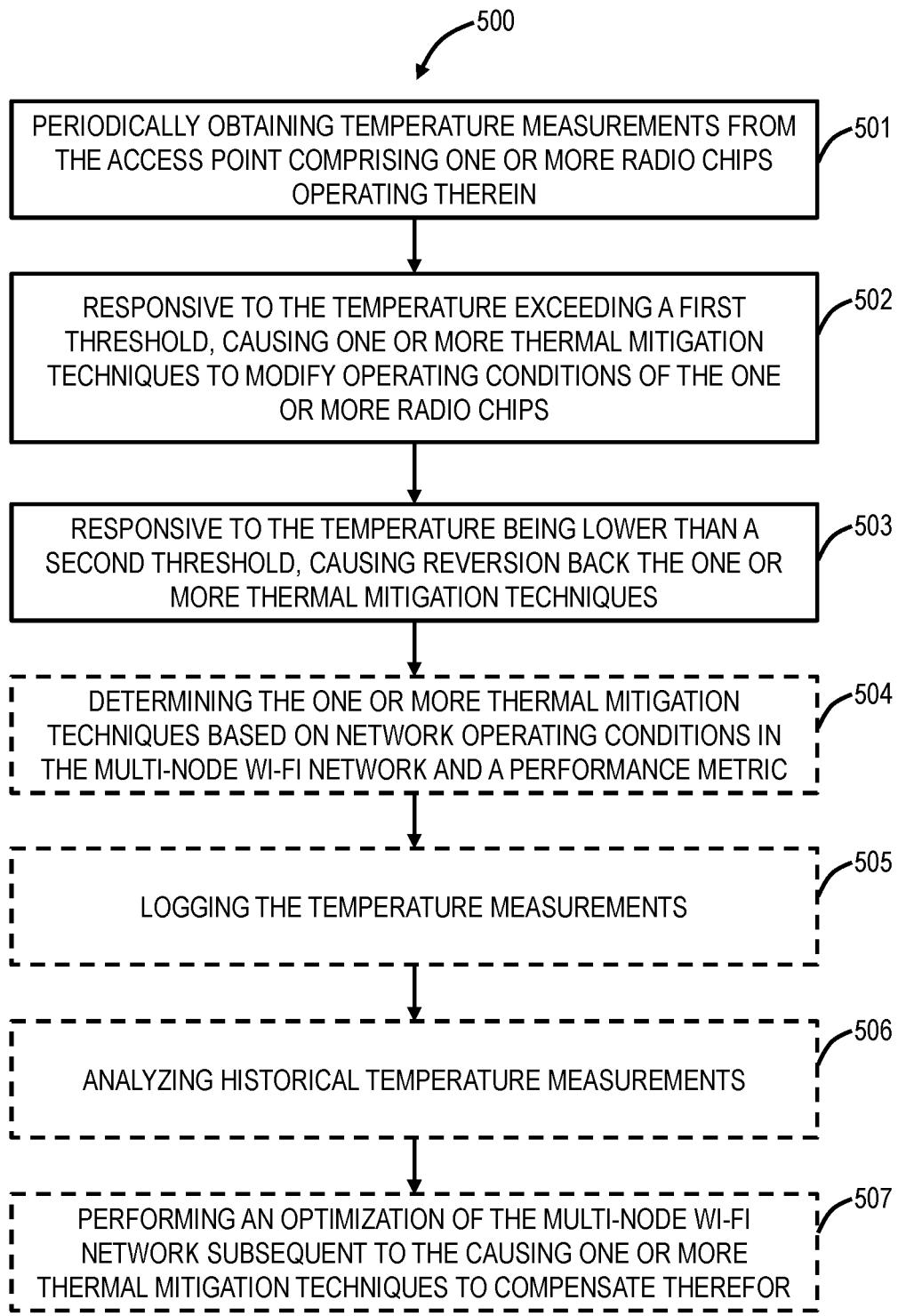
FIG. 9 is a flowchart of a process for cloud-based thermal control of an access point.

FIG. 9 is a flowchart of a process 500 for cloud-based thermal control of an access point. The process 500 is implemented in the cloud 12 by the server(s) 20 connected to any of the access points 14, the access points 34, the mesh nodes 36, the repeater 38, and the like. The process 500 includes periodically obtaining temperature measurements from the access point including one or more radio chips operating therein (step 501); responsive to the temperature exceeding a first threshold, causing one or more thermal mitigation techniques to modify operating conditions of the one or more radio chips (step 502); and, responsive to the temperature being lower than a second threshold, causing reversion back the one or more thermal mitigation techniques (step 503).

The one or more thermal mitigation techniques can include any of reducing a Multiple Input, Multiple Output (MIMO) dimension on the one or more radio chips; turning off one of the one or more radio chips; reducing power of a transmitter associated with one of the one or more radio chips; and controlling a duty cycle of the transmitter associated with the one or more radio chips. The access point can be part of a multi-node Wi-Fi network, and the one or more thermal mitigation techniques can include changing a topology of the multi-node Wi-Fi network to adjust the operating conditions of the access point, steering clients associated with the access point to adjust the operating conditions of the access point, and band steering clients associated with the access point between the plurality of radios.

The access point can be part of a multi-node Wi-Fi network, and the process can further include determining the one or more thermal mitigation techniques based on network operating conditions in the multi-node Wi-Fi network and a performance metric (step 504). The performance metric can include maximizing throughput, wherein the throughput is one of a total throughput to all clients, the throughput to the slowest client, and a weighted throughput among all clients. The performance metric can be quality based including one of consistency of throughput throughout the multi-node Wi-Fi network, latency minimization, and jitter minimization.

The process 500 can further include logging the temperature measurements (step 505); and analyzing historical temperature measurements (step 506) for one or more of identifying values for the first threshold and the second threshold; determining product lifetime of the access point; informing design of new access points; and identifying manufacturing defects. The access point can be part of a multi-node Wi-Fi network, and the process 40 can further include performing an optimization of the multi-node Wi-Fi network subsequent to the causing one or more thermal mitigation techniques to compensate therefor (step 507).

In another embodiment, a cloud-based controller configured to perform thermal control of an access point includes a network interface 206 communicatively coupled to the access point; one or more processors 202 communicatively coupled to the network interface 206; and memory 210 storing instructions that, when executed, cause the one or more processors 202 to periodically obtain temperature measurements from the access point including one or more radio chips operating therein; responsive to the temperature exceeding a first threshold, cause one or more thermal mitigation techniques to modify operating conditions of the one or more radio chips; and, responsive to the temperature being lower than a second threshold, cause reversion back the one or more thermal mitigation techniques.

In a further embodiment, a Wi-Fi network controlled by a cloud-based controller includes one or more access points 14 each including one or more radios 104; wherein the cloud-based controller is configured to periodically obtain temperature measurements from the one or more access points; responsive to the temperature exceeding a first threshold in an access point of the one or more access points, cause one or more thermal mitigation techniques to modify operating conditions of the one or more radio chips in the access point; and, responsive to the temperature being lower than a second threshold, cause reversion back the one or more thermal mitigation techniques.

Figure 10:
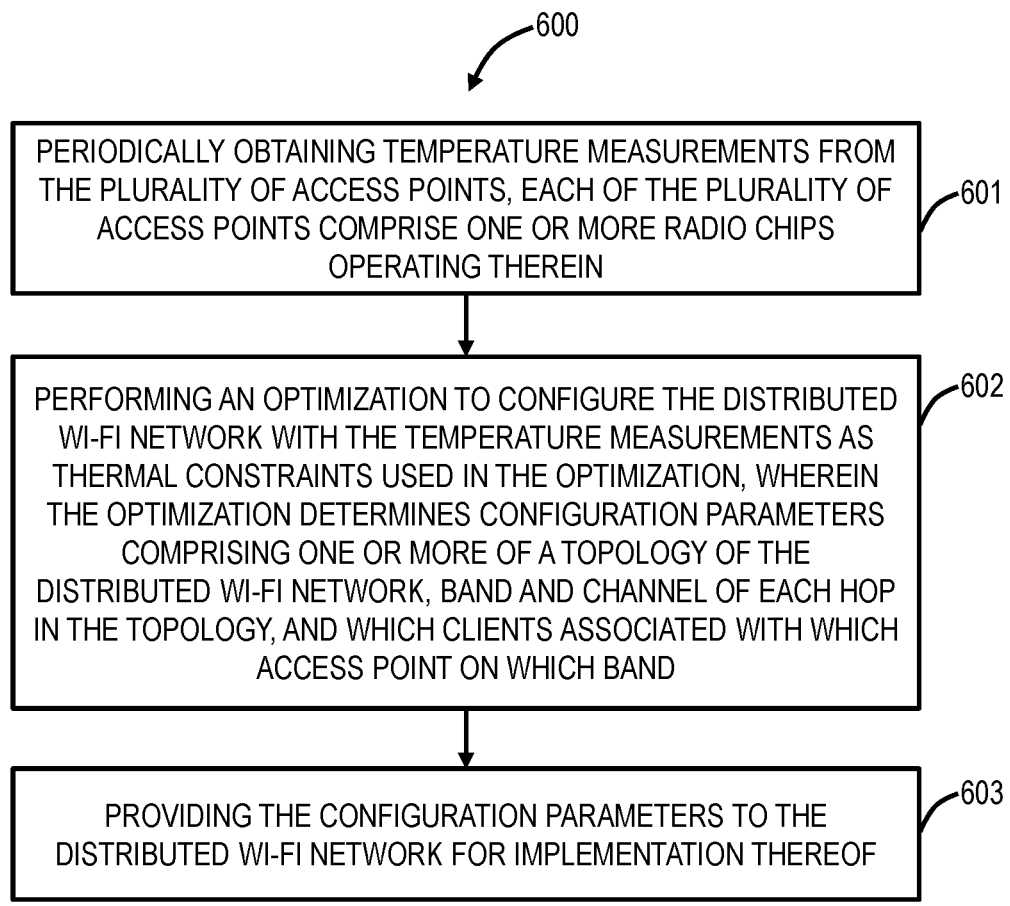
FIG. 10 is a flowchart of a process for optimizing a distributed Wi-Fi network considering thermal management of a plurality of access points in the distributed Wi-Fi network.

Thermal Management of Wireless Access Points Based on Optimization and Operation in a Distributed Wi-Fi Network FIG. 10 is a flowchart of a process 600 for optimizing a distributed Wi-Fi network 10 considering thermal management of a plurality of access points 14 in the distributed Wi-Fi network 10. The process 600 includes periodically obtaining temperature measurements from the plurality of access points, each of the plurality of access points include one or more radio chips operating therein (step 601); performing an optimization 270 to configure the distributed Wi-Fi network with the temperature measurements as thermal constraints used in the optimization, wherein the optimization determines configuration parameters including one or more of a topology of the distributed Wi-Fi network, band and channel of each hop in the topology, and which clients associated with which access point on which band (step 602); and providing the configuration parameters to the distributed Wi-Fi network for implementation thereof (step 603).

The configuration parameters can include adjustments to one or more radio chips for thermal mitigation based on the thermal constraints, and wherein the adjustments can include any of reducing a Multiple Input, Multiple Output (MIMO) dimension on one or more radio chips; turning off one or more radio chips; reducing power of a transmitter associated with one or more radio chips; and controlling a duty cycle of the transmitter associated with one or more radio chips. The optimization 270 adjusts the configuration parameters to compensate for the adjustments for thermal mitigation.

The optimization 270 utilizes an objective function which factors an expected temperature of each of the plurality of access points therein with throughput and/or quality. The optimization 270 has an input 260 of anticipated loads of each of client based on historical measurements and an output 262 of the configuration parameters including client assignments based on the thermal constraints. The optimization 270 determines the configuration parameters to change the topology based on the thermal constraints such that access points operating at high temperatures have reduced the load. The optimization 270 determines the configuration parameters to change steer clients to access points based on the thermal constraints such that access points operating at high temperatures have reduced client load.

The optimization 270 determines the configuration parameters based on network operating conditions and a performance metric, wherein the performance metric includes one of maximizing throughput, wherein the throughput is one of a total throughput to all clients, the throughput to the slowest client, and a weighted throughput among all clients; and maximizing quality including one of consistency of throughput throughout the distribution Wi-Fi network, latency minimization, and jitter minimization. The optimization 270 utilizes the thermal constraint which is specific to each radio to implement a thermal mitigation technique for each radio with a temperature above a threshold and to change the configuration parameters to compensate for the thermal mitigation technique. The optimization 270 ignores the thermal constraint of each access point until the thermal constraint exceeds a threshold and then the thermal constraint is treated as a dominant factor in the optimization for that access point.

In another embodiment, a cloud-based controller configured to control a Wi-Fi network includes a plurality of access points includes a network interface 206 communicatively coupled to the Wi-Fi network; one or more processors 202 communicatively coupled to the network interface 206; and memory 210 storing instructions that, when executed, cause the one or more processors 202 to periodically obtain temperature measurements from the plurality of access points, each of the plurality of access points include one or more radio chips operating therein; perform an optimization to configure the distributed Wi-Fi network with the temperature measurements as thermal constraints used in the optimization, wherein the optimization determines configuration parameters including one or more of a topology of the distributed Wi-Fi network, band and channel of each hop in the topology, and which clients associated with which access point on which band; and provide the configuration parameters to the distributed Wi-Fi network for implementation thereof.

In a further embodiment, a Wi-Fi network controlled by a cloud-based controller includes one or more access points 14 each including one or more radios 104; wherein the cloud-based controller is configured to periodically obtain temperature measurements from the plurality of access points, each of the plurality of access points include one or more radio chips operating therein; perform an optimization to configure the distributed Wi-Fi network with the temperature measurements as thermal constraints used in the optimization, wherein the optimization determines configuration parameters including one or more of a topology of the distributed Wi-Fi network, band and channel of each hop in the topology, and which clients associated with which access point on which band; and provide the configuration parameters to the distributed Wi-Fi network for implementation thereof.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a device to perform steps of:
   determining temperature associated with an access point having a plurality of radio chips during operation in a Wi-Fi network, wherein the temperature is the temperature of any component of the access point and/or the overall temperature of the access point;
   comparing the determined temperature to a threshold; and
   responsive to the temperature exceeding a threshold, performing one or more thermal mitigation techniques to modify operating conditions of the access point in the Wi-Fi network for a reduction in power dissipation of the access point while still providing the operation in the Wi-Fi network.

2. The non-transitory computer-readable storage medium of claim 1, wherein the device is the access point.

3. The non-transitory computer-readable storage medium of claim 1, wherein the device is a cloud controller located external from the Wi-Fi network.

4. The non-transitory computer-readable storage medium of claim 1, wherein the steps further include
   determining the temperature after the one or more thermal mitigation techniques;
   comparing the determined temperature to a second threshold; and
   responsive to the temperature being lower that the second threshold, reverting the one or more thermal mitigation techniques.

5. The non-transitory computer-readable storage medium of claim 4, wherein the first threshold and the second threshold are the same.

6. The non-transitory computer-readable storage medium of claim 4, wherein the first threshold and the second threshold are different for a hysteresis band to maintain stability.

7. The non-transitory computer-readable storage medium of claim 1, wherein the one or more thermal mitigation techniques include reducing a Multiple Input, Multiple Output (MIMO) dimension.

8. The non-transitory computer-readable storage medium of claim 7, wherein the MIMO dimension is reduced only on transmissions and not on receptions.

9. The non-transitory computer-readable storage medium of claim 1, wherein the one or more thermal mitigation techniques include selectively turning off or reducing power in circuits in the access point.

10. The non-transitory computer-readable storage medium of claim 1, wherein the one or more thermal mitigation techniques include controlling a duty cycle of a transmitter in the access point.

11. The non-transitory computer-readable storage medium of claim 1, wherein the one or more thermal mitigation techniques include moving a client device from one of the radio chips to a different one of the radio chips in the access point.

12. The non-transitory computer-readable storage medium of claim 1, wherein the one or more thermal mitigation techniques include adjusting the access point, including turning off the access point, based on the operation of one or more additional access points in the Wi-Fi network.

13. A method comprising:
   determining temperature associated with an access point having a plurality of radio chips during operation in a Wi-Fi network, wherein the temperature is the temperature of any component of the access point and/or the overall temperature of the access point;
   comparing the determined temperature to a threshold; and
   responsive to the temperature exceeding a threshold, performing one or more thermal mitigation techniques to modify operating conditions of the access point in the Wi-Fi network for a reduction in power dissipation of the access point while still providing the operation in the Wi-Fi network.

14. The method of claim 13, wherein the device is the access point.

15. The method of claim 13, wherein the device is a cloud controller located external from the Wi-Fi network.

16. The method of claim 13, further comprising
   determining the temperature after the one or more thermal mitigation techniques;
   comparing the determined temperature to a second threshold; and
   responsive to the temperature being lower that the second threshold, reverting the one or more thermal mitigation techniques.

17. The method of claim 13, wherein the one or more thermal mitigation techniques include any of
   reducing a Multiple Input, Multiple Output (MIMO) dimension;

selectively turning off or reducing power in circuits in the access point;

controlling a duty cycle of a transmitter in the access point;

moving a client device from one of the radio chips to a different one of the radio chips in the access point; and adjusting the access point, including turning off the access point, based on the operation of one or more additional access points in the Wi-Fi network.

18. An apparatus comprising:
a processor and memory storing instructions that, when executed, cause the processor to perform steps of
determining temperature associated with an access point having a plurality of radio chips during operation in a Wi-Fi network, wherein the temperature is the temperature of any component of the access point and/or the overall temperature of the access point;
comparing the determined temperature to a threshold; and
responsive to the temperature exceeding a threshold, performing one or more thermal mitigation techniques to modify operating conditions of the access point in the Wi-Fi network for a reduction in power dissipation of the access point while still providing the operation in the Wi-Fi network.

19. The apparatus of claim 18, wherein the apparatus is one of the access point and a cloud controller located external from the Wi-Fi network.

20. The apparatus of claim 18, wherein the one or more thermal mitigation techniques include any of reducing a Multiple Input, Multiple Output (MIMO) dimension;

selectively turning off or reducing power in circuits in the access point;

controlling a duty cycle of a transmitter in the access point;

moving a client device from one of the radio chips to a different one of the radio chips in the access point; and adjusting the access point, including turning off the access point, based on the operation of one or more additional access points in the Wi-Fi network.

* * * * *